United States Patent Office 3,004,928
Patented Oct. 17, 1961

3,004,928
PREPARATION OF MANGANESE DIOXIDE CATALYST
Robert M. Haines and John W. Walsh, Crystal Lake, Ill., assignors to The Pure Oil Company, Chicago, Ill., a corporation of Ohio
No Drawing. Filed Aug. 10, 1956, Ser. No. 603,239
6 Claims. (Cl. 252—430)

This invention relates to a novel method for preparing manganese dioxide and to the product resulting from the novel process.

A conventional method for preparing manganese dioxide is by hydrolysis of potassium permanganate in aqueous solution. This method has several drawbacks. Reaction occurs slowly, is time-consuming, and the resulting product, if it is to be used as a catalyst or catalyst promoter in organic oxidation reactions, must be dried to avoid physical operating difficulties, such as excessive foaming, phase separation, etc. The drying step causes agglomeration of the manganese dioxide particles, and these agglomerates are not as effective in accelerating the rate of the oxidation reaction as is more finely divided material. The particle size of the manganese dioxide greatly affects the oxidation reaction rate. The greatest rate is obtained when the manganese dioxide is in the form of a colloidal suspension.

The method of our invention eliminates the several disadvantages associated with manganese dioxide prepared in accordance with prior art methods. In accordance with our invention, potassium or other permanganate salt soluble in alcohols is dissolved in anhydrous or substantially anhydrous methyl alcohol. Reaction between the alcohol and the permanganate occurs rapidly to form a colloidal suspension of finely divided manganese dioxide in the excess alcohol.

It is an object of our invention to provide a novel method for preparing manganese dioxide.

Another object of the invention is to prepare a colloidal suspension of finely divided manganese dioxide in a non-aqueous medium.

Further objects of the invention will become manifest from the following description:

In accordance with our invention, a permanganate salt, such as sodium, potassium, magnesium, lithium, calcium, or zinc permanganate is dissolved in substantially anhydrous methyl alcohol at temperatures ranging from room temperature, that is, approximately 68–80° F., to the boiling point of methyl alcohol, and the solution is allowed to remain at this temperature until the reaction has reached completion. In order to obtain a stable suspension of manganese dioxide in the alcohol, it is preferred that not more than about 1.5 grams of potassium permanganate or equivalent amount of other permanganate be added per liter of alcohol. If larger amounts of permanganate are used, although finely divided manganese dioxide forms upon standing for a few hours, most of it is not colloidal, and upon prolonged standing, agglomeration into larger particles occurs. In order to speed up the reaction, it may be desirable to add to the methyl alcohol-permanganate solution a small amount of an aldehyde, such as formaldehyde, acetaldehyde, or iso-valeraldehyde. The aldehyde may be used in the form of an aqueous solution, but since the presence of water is undesirable with respect to both the characteristics of the manganese dioxide produced and the liquid phase catalysis for which the suspension is to be used, it is preferable to use anhydrous aldehyde, if possible, and any introduction of water should be kept to a minimum. The amount of aldehyde may be approximately 0.2–2% of the total solution but should be sufficient to perceptibly speed up the reaction.

Although any aldehyde will catalyze the reaction, we prefer to use an aldehyde that boils at a temperature sufficiently below the temperature at which the manganese dioxide is to be used as a catalyst, to enable the aldehyde to be distilled off during heating of the reaction mixture. For example, if the manganese dioxide suspension is to be used in the oxidation of lubricating oils and waxes at temperatures of 250 to 300° F. it is preferred that the aldehyde have a boiling point not above that of iso-valeraldehyde (iso-pentanal) or lower. Although benzaldehyde and other aromatic aldehydes will catalyze the formation of the manganese dioxide, we prefer not to use them when the resulting manganese dioxide is to be used in lower temperature oxidation because of the high boiling point of the aldehyde (355° F.) and the difficulty of removing it without adversely affecting the oxidation product. However, where higher temperature oxidation is practiced, higher boiling aldehydes, including alkyl, aryl and aralkyl aldehydes can be used. In those cases where it is desirable to remove the aldehyde from the reaction mixture prior to oxidation the aldehyde should boil at least 50° F. below the initial boiling point of the material to be oxidized and preferably at least 50° F. below the desired oxidation temperature when the oxidation temperature is below the initial boiling point of the material to be oxidized.

The following specific examples will illustrate the invention:

*Example I*

To 300 ml. of absolute methanol was added 0.75 gm. of potassium permanganate. The mixture was stirred at room temperature until the permanganate dissolved and then allowed to stand until reaction was completed. Reaction was completed in 35 minutes and the resulting product consisted of finely divided manganese dioxide dispersed in the alcohol. Since 0.75 gm. of potassium permanganate in 300 ml. of alcohol was in excess of the prescribed 1.5 gm./liter, the product was predominantly only finely divided manganese dioxide rather than substantially colloidal.

*Example II*

To 475 ml. of absolute methanol there was added 0.7 gm. of potassium permanganate and 25 ml. of a commercial, 40% solution of formaldehyde in water. Completion of the reaction required only 4 minutes, thus demonstrating the effectiveness of the formaldehyde in speeding up the reaction. The water solution of formaldehyde was used because anhydrous formaldehyde is not commercially available, and since it is an unstable and extremely volatile gas (B.P.—21° C.), anhydrous formaldehyde is difficult to handle.

*Example III*

In order to show that the formaldehyde was instrumental in accelerating the reaction in Example II, a solution was prepared by mixing together 400 ml. of absolute methanol and 15 ml. of water. To this solution was added 0.7 gm. of potassium permanganate. The reaction was completed in 19 minutes, appreciably longer than the 4 minutes in Example II.

*Example IV*

The experiment of Example III was repeated, but with a higher concentration of permanganate. A solution was prepared by mixing together 291 ml. of absolute methanol, 9 ml. of water and 0.75 gm. of potassium permanganate. The potassium permanganate was completely converted to manganese dioxide in 18 minutes.

*Example V*

To a mixture of 490 cc. of absolute methanol and 10 cc. of iso-valeraldehyde, was added 0.7 gm. of potassium permanganate. Conversion of the permanganate to manganese dioxide took place immediately and was complete in less than 4 minutes. No water was present in the reaction mixture.

It will be apparent that if an anhydrous suspension of manganese dioxide in alcohol is desired and it is desired to speed up reaction by the addition of a small amount of aldehyde, anhydrous formaldehyde can be generated from paraformaldehyde by heating and bubbled through the solution undergoing reaction. Alternatively, impure methanol which contains small amounts of aldehydes may be used. Or, by distillation under reduced pressure, water (and other impurities such as formal) can be removed from the commercial "formalin" at a temperature at which the hydrated formaldehyde is stable. Thereafter, the pressure is increased and the pure, anhydrous formaldehyde is distilled out. It will also be apparent that if it is not necessary to have an absolutely anhydrous suspension of manganese dioxide in alcohol, ordinary methanol containing up to 5% of water may be used, thereby speeding up the reaction. The amount of water and/or aldehyde added to the solution, if used, should be sufficient to accelerate the reaction. Amounts varying from approximately 1 or 2% by volume to 5% or more are effective.

As previously pointed out, if the amount of permanganate dissolved in the alcohol is limited to the equivalent of about 1.5 gm. per liter of potassium permanganate, the resulting product usually comprises a colloidal solution, together with very finely divided manganese dioxide suspended in alcohol, which will remain stable for several days. On the other hand, if the amount of permanganate exceeds the equivalent of about 1.5 gm. per liter of potassium permanganate, the resulting manganese dioxide usually forms a much less finely divided precipitate which settles out in a comparatively short time. Such precipitates, however, if used soon after preparation, can be satisfactory catalysts or catalyst promoters. The bulk of alcohol may be decreased by decanting most of the alcohol from the solids formed.

The colloidal suspension of manganese dioxide resulting from the process is especially valuable as a catalyst or catalyst promoter in liquid-phase, organic oxidation reactions, such as the oxidation of hydrocarbon oils and waxes to form alcohols, aldehydes, acids and other oxidation products. Upon raising the temperature of the mixture to oxidation temperature, the alcohol present readily distills off, leaving the manganese dioxide thoroughly dispersed in the liquid hydrocarbon. Addition of the suspension to hot oil is undesirable because the alcohol is immediately stripped off, precipitating the manganese dioxide before intimate intermixing with the oil can be accomplished and thereby reducing the effectiveness of the manganese dioxide. Because the suspension is essentially anhydrous it can be heated with the oil without producing foaming, "bumping," spattering, or other undesirable processing difficulties.

To demonstrate the efficacy of manganese dioxide made in accordance with the invention as an oxidation promoter, oxygen was bubbled through 0.4 liter of neutral mineral lubricating oil having a viscosity of 85 SUS at 100° F. at the rate of 46 liters per hour while the oil was maintained at a temperature of 250° F. The oxygen was bubbled through the oil by means of a sintered glass bubbler, and 3.9 gm. of zinc stearate was added to the oil as catalyst. After 370 minutes of oxidation, the neutralization number of the oil, as measured by the 1948 ASTM neutralization number, had increased from less than 0.03 to only 5.4.

The run was repeated under the same conditions except that in addition to the zinc stearate, 0.3 gm. of manganese dioxide suspended in alcohol and prepared in accordance with the method of Example I was added to the oil. At the end of only 170 minutes of oxidation the neutralization number had increased to 17.9.

It will be seen, therefore, that we have devised a novel method for preparing manganese dioxide which is much more rapid than prior art methods and which can be carried out at ordinary temperatures without the use of water. In accordance with our method, the reaction is complete in a period of time ranging from a few minutes up to not more than approximately one hour, at room temperature (68–80° F.), whereas prior art methods require higher temperatures, much longer reaction periods and subsequent drying of the catalyst. Manganese dioxide prepared in accordance with a commonly used prior art method, by dissolving 1.6 gm. of potassium permanganate in one liter of water to which concentrated ammonium hydroxide was added dropwise while maintaining the solution at 190° F., required 53 minutes for complete reduction of the permanganate to manganese dioxide, as evidenced by a color change from purple to coffee-brown. The manganese dioxide was partially dried by filtering and then was dried by heating at 110° C. for several hours. Total time consumed in obtaining a dried product was more than two days. In the method of G. A. Mills, set out in the Journal of The American Chemical Society, vol. 62, No. 10, pages 28–33, involving reaction of potassium permanganate and water, several hours were required to complete the reaction at 100° C.

In carrying out the process of the invention, the use of an amount of a permanganate in excess of the amount which is soluble in the alcohol should be avoided since the alcohol will react only at the surfaces of the undissolved crystals until they become coated with manganese dioxide, at which time the reaction stops. This same result occurs when excessive amounts of aldehyde are incorporated, apparently because the reaction is so fast that the crystals become coated with manganese dioxide before they have dissolved.

We claim:

1. The method of preparing substantially anhydrous manganese dioxide in a finely divided state comprising dissolving a permanganate salt in methyl alcohol in the substantial absence of water and in admixture with a small amount of an aldehyde sufficient to increase the speed of reaction, and maintaining the solution at 60°–80° F., until formation of substantially anhydrous manganese dioxide is substantially completed.

2. The method in accordance with claim 1 in which the aldehyde is an aliphatic aldehyde boiling below 250° F.

3. The method in accordance with claim 1 in which the aldehyde is formaldehyde.

4. The method in accordance with claim 1 in which the aldehyde is iso-valeraldehyde.

5. The method in accordance with claim 1 in which the solution contains a small amount of water, less than about 5%, and a small amount of formaldehyde, sufficient to increase the speed of the reaction.

6. The method in accordance with claim 5 in which the water and formaldehyde each are present in amounts of about 0.5 to 5% by volume.

References Cited in the file of this patent

Mellor: "Comprehensive Treatise on Inorganic and Theoretical Chemistry," Longmans, Green & Co., N.Y., 1923, vol. 12, pages 260, 262 and 324.